United States Patent
Chaudhry et al.

(10) Patent No.: US 6,754,775 B2
(45) Date of Patent: Jun. 22, 2004

(54) METHOD AND APPARATUS FOR FACILITATING FLOW CONTROL DURING ACCESSES TO CACHE MEMORY

(75) Inventors: Shailender Chaudhry, San Francisco, CA (US); Marc Tremblay, Menlo Park, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 169 days.

(21) Appl. No.: 10/161,794

(22) Filed: Jun. 4, 2002

(65) Prior Publication Data

US 2002/0188807 A1 Dec. 12, 2002

Related U.S. Application Data (60) Provisional application No. 60/296,553, filed on Jun. 6, 2001.

(51) Int. Cl.⁷ .............................................. G06F 12/00
(52) U.S. Cl. ...................... 711/128; 711/140; 711/122
(58) Field of Search ................................. 711/140, 144, 711/143, 128, 133

(56) References Cited

U.S. PATENT DOCUMENTS

| | | | | |
|---|---|---|---|---|
| 5,526,510 A | | 6/1996 | Akkary et al. .............. | 395/460 |
| 6,085,294 A | * | 7/2000 | Van Doren et al. ......... | 711/144 |
| 6,148,372 A | * | 11/2000 | Mehrotra et al. ........... | 711/122 |
| 6,226,713 B1 | | 5/2001 | Mehrotra .................... | 711/118 |
| 6,470,425 B1 | * | 10/2002 | Yamashiroya ............... | 711/133 |
| 6,594,701 B1 | * | 7/2003 | Forin ......................... | 709/232 |

\* cited by examiner

*Primary Examiner*—Matthew Kim
*Assistant Examiner*—Shane M Thomas
(74) *Attorney, Agent, or Firm*—Park, Vaughan & Fleming LLP (57) ABSTRACT

One embodiment of the present invention provides a system that facilitates flow control to support pipelined accesses to a cache memory. When an access to the cache memory generates a miss, the system increments a number of outstanding misses that are currently in process for a set in the cache to which the miss is directed. If the number of outstanding misses is greater than or equal to a threshold value, the system stalls generation of subsequent accesses to the cache memory until the number of outstanding misses for each set in the cache memory falls below the threshold value. Upon receiving a cache line from a memory subsystem in response to an outstanding miss, the system identifies a set that the outstanding miss is directed to. The system then installs the cache line in an entry associated with the set. The system also decrements a number of outstanding misses that are currently in process for the set. If the number of outstanding misses falls below the threshold value as a result of decrementing, and if no other set has a number of outstanding misses that is greater than or equal to the threshold value, the system removes the stall condition so that subsequent accesses can be generated for the cache memory.

20 Claims, 6 Drawing Sheets

METHOD AND APPARATUS FOR FACILITATING FLOW CONTROL DURING ACCESSES TO CACHE MEMORY

RELATED APPLICATION

This application hereby claims priority U.S.C. §119(e) to U.S. Provisional Patent Application No. 60/296,553, filed on Jun. 6, 2001, entitled "Method and Apparatus for Facilitating Flow Control During Accesses to Cache Memory," by inventors Shailender Chaudhry and Marc Tremblay.

BACKGROUND

1. Field of the Invention

The present invention relates to the design of cache memories in computer systems. More specifically, the present invention relates to a method and an apparatus for facilitating flow control in order to support pipelined accesses to and from a cache memory.

2. Related Art

As microprocessor clock speeds continue to increase at an exponential rate, it is becoming increasingly harder to provide sufficient data transfer rates between functional units on a microprocessor chip. For example, data transfers between a Level Two (L2) cache and a Level One (L1) cache can potentially require a large number of processor clock cycles. Moreover, the processor will be severely underutilized if it has to wait a large number of clock cycles to complete each access to L2 cache. Hence, in order to keep the processor busy, it is necessary to pipeline data transfers between L2 cache and the processor.

However, pipelining introduces problems. In a pipelined architecture, a number of accesses from the processor to the L2 cache can potentially be in flight at any given time. Furthermore, service times for accesses to the L2 cache are unpredictable because each access can potentially cause a cache miss if the desired data item is not present in L2 cache. Hence, what is needed is a mechanism for halting subsequent accesses to the L2 cache, as well as a mechanism for queuing in flight transactions in case preceding accesses generate time-consuming cache misses.

Additionally, there are limitations on the number of outstanding cache misses that can be pending at any given time. Caches are typically designed with a set-associative architecture that uses a number of address bits from a request to determine a "set" to which the request is directed. A set-associative cache stores a number of entries for each set, and these entries are typically referred to as "ways". For example, a four-way set-associative cache contains four entries for each set. This means that a four-way set associative cache essentially provides a small four-entry cache for each set.

Note that it is desirable not to allow more than four outstanding miss operations to be pending on any given set in a four-way set-associative cache. For example, if a system allows five outstanding misses, the five misses could potentially return at about the same time, and there would only be room to accommodate four of them. In this case, one of the returned cache lines would immediately be kicked out of the cache. Dealing with this problem can greatly complicate the design of a cache. Hence, what is needed is a mechanism for halting subsequent accesses to the L2 cache when a given set has too many pending miss operations.

SUMMARY

One embodiment of the present invention provides a system that facilitates flow control to support pipelined accesses to a cache memory. When an access to the cache memory generates a miss, the system increments a number of outstanding misses that are currently in process for a set in the cache to which the miss is directed. If the number of outstanding misses is greater than or equal to a threshold value, the system stalls generation of subsequent accesses to the cache memory until the number of outstanding misses for each set in the cache memory falls below the threshold value. Upon receiving a cache line from a memory subsystem in response to an outstanding miss, the system identifies a set that the outstanding miss is directed to. The system then installs the cache line in an entry associated with the set. The system also decrements a number of outstanding misses that are currently in process for the set. If the number of outstanding misses falls below the threshold value as a result of decrementing, and if no other set has a number of outstanding misses that is greater than or equal to the threshold value, the system removes the stall condition so that subsequent accesses can be generated for the cache memory.

In one embodiment of the present invention, the system determines whether to remove the stall condition by examining a state machine. This state machine keeps track of a number of outstanding misses that cause sets in the cache memory to meet or exceed the threshold value.

In one embodiment of the present invention, the system additionally replays the access that caused the cache line to be retrieved.

In one embodiment of the present invention, the system increments the number of outstanding misses that are currently in process for the set by setting a prior miss bit that is associated with an entry for a specific set and way in the cache memory. This prior miss bit indicates that an outstanding miss is in process and will eventually fill the entry for the specific set and way. In a variation on this embodiment, the prior miss bit is stored along with a tag for the specific set and way, so that a tag lookup returns the prior miss bit.

In one embodiment of the present invention, the cache memory is a Level Two (L2) cache and the access is received from a Level One (L1) cache.

In one embodiment of the present invention, receiving the access involves receiving the access from a queue located at the L2 cache, wherein the queue contains accesses generated by the L1 cache. In this embodiment, the system uses credit-based flow control to limit sending of accesses from the L1 cache into the queue, so that the queue does not overflow.

In one embodiment of the present invention, the L2 cache receives accesses from a plurality of L1 caches.

In one embodiment of the present invention, the threshold value is less than a number of entries in the cache memory associated with each set. This effectively reserves one or more additional entries for each set to accommodate in-flight accesses that have been generated but not received at the cache memory.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Multiprocessor System

Figure 1:
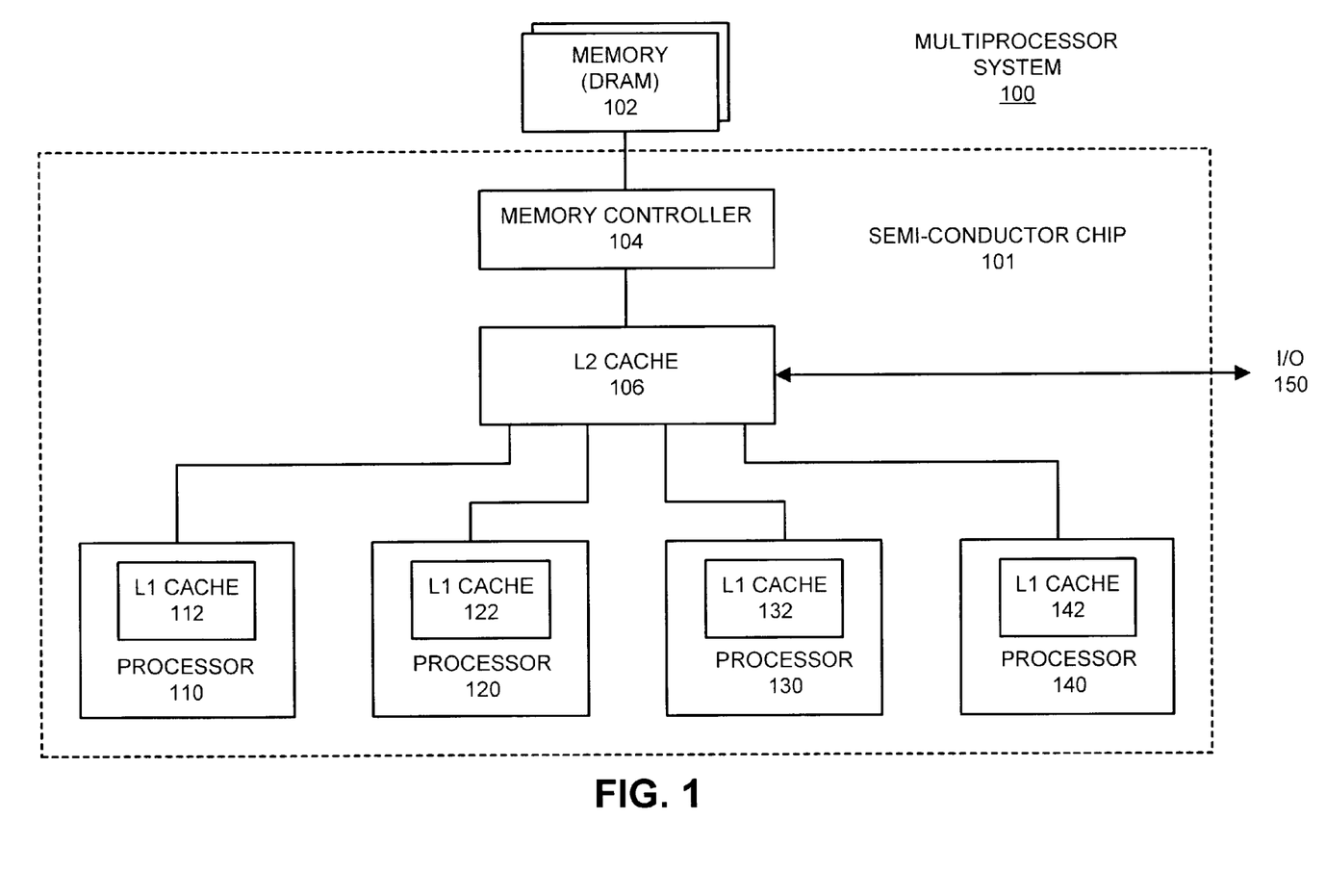
FIG. 1 illustrates a multiprocessor system in accordance with an embodiment of the present invention.

FIG. 1 illustrates a multiprocessor system 100 in accordance with an embodiment of the present invention. Note that most of multiprocessor system 100 is located within a single semiconductor chip 101. More specifically, semiconductor chip 101 includes a number of processors 110, 120, 130 and 140, which contain level one (L1) caches 112, 122, 132 and 142, respectively. Note that L1 caches 112, 122, 132 and 142 may be separate instruction and data caches, or alternatively, unified instruction/data caches. L1 caches 112, 122, 132 and 142 are coupled to level two (L2) cache 106. L2 cache 106 is in turn coupled to off-chip memory 102 through memory controller 104.

In one embodiment of the present invention, L1 caches 112, 122, 132 and 142 are write-through caches, which means that all updates to L1 caches 112, 122, 132 and 142 are automatically propagated to L2 cache 106. This simplifies the coherence protocol, because if processor 110 requires a data item that is present in L1 cache 112, processor 110 can receive the data item from L2 cache 106 without having to wait for L1 cache 112 to source the data item.

Figure 2:
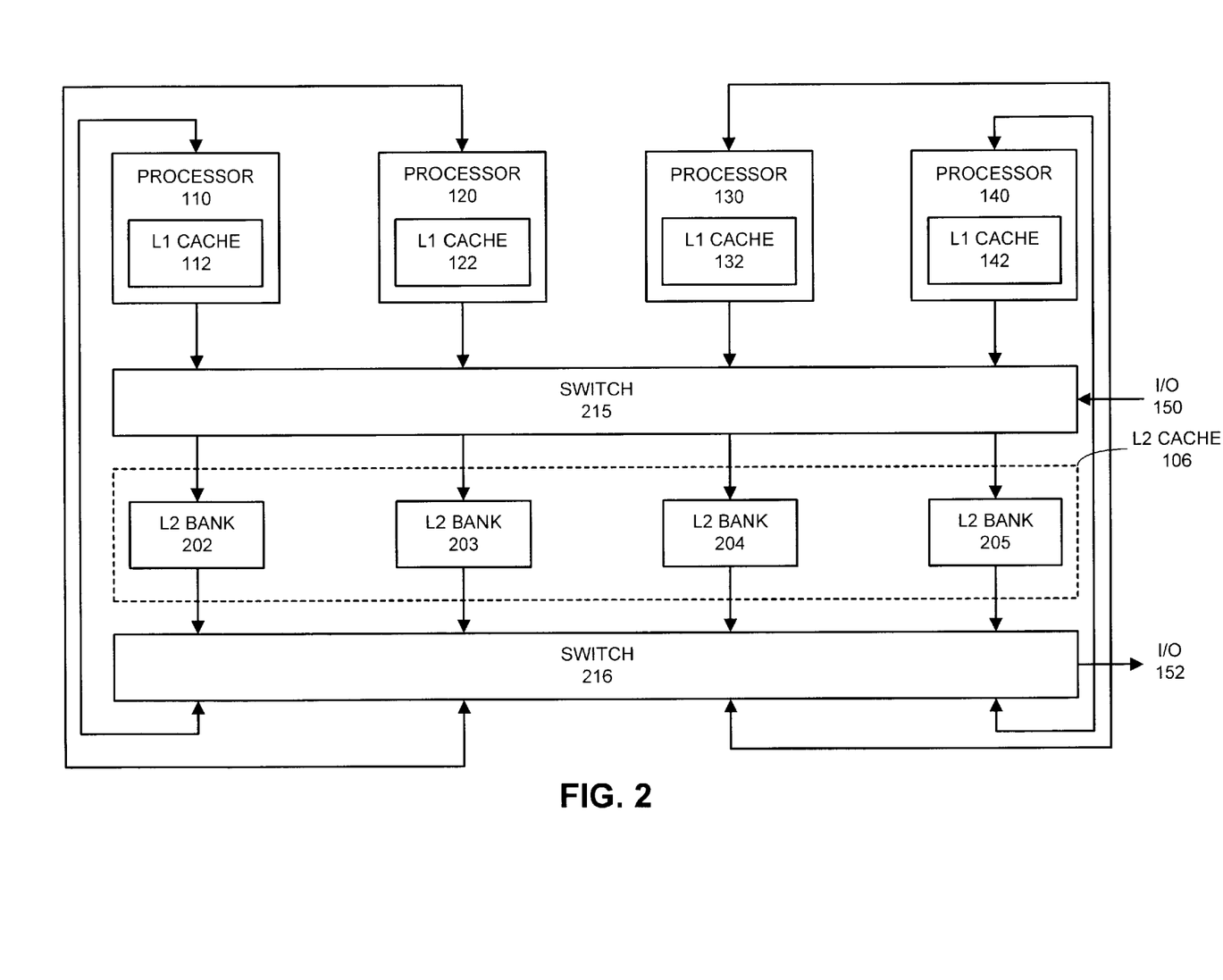
FIG. 2 illustrates in more detail the multiprocessor system illustrated in FIG. 1 in accordance with an embodiment of the present invention.

FIG. 2 illustrates in more detail the multiprocessor system illustrated in FIG. 1B in accordance with an embodiment of the present invention. In this embodiment, L2 cache 106 is implemented with four banks 202–205, which can be accessed in parallel by processors 110, 120, 130 and 140 through switches 215 and 216. Switch 215 handles communications that feed from processors 110, 120, 130 and 140 into L2 banks 202–205. Switch 216 handles communications in the reverse direction, from L2 banks 202–205 to processors 110, 120, 130 and 140.

Note that only two bits of the address are required to determine which of the four banks 202–205 a memory request is directed to. Also note that switch 215 additionally includes an I/O port 150 for receiving communications from I/O devices, and switch 216 includes an I/O port 152 for sending communications to I/O devices.

Note that by using this "banked" architecture, it is possible to concurrently connect each L1 cache to its own bank of L2 cache, thereby increasing the bandwidth of L2 cache 106.

Furthermore, note although the present invention is described in the context of a banked L2 cache, the present invention can be applied to any type of cache, and is not meant to be limited to a banked architecture.

L2 Bank

Figure 3:
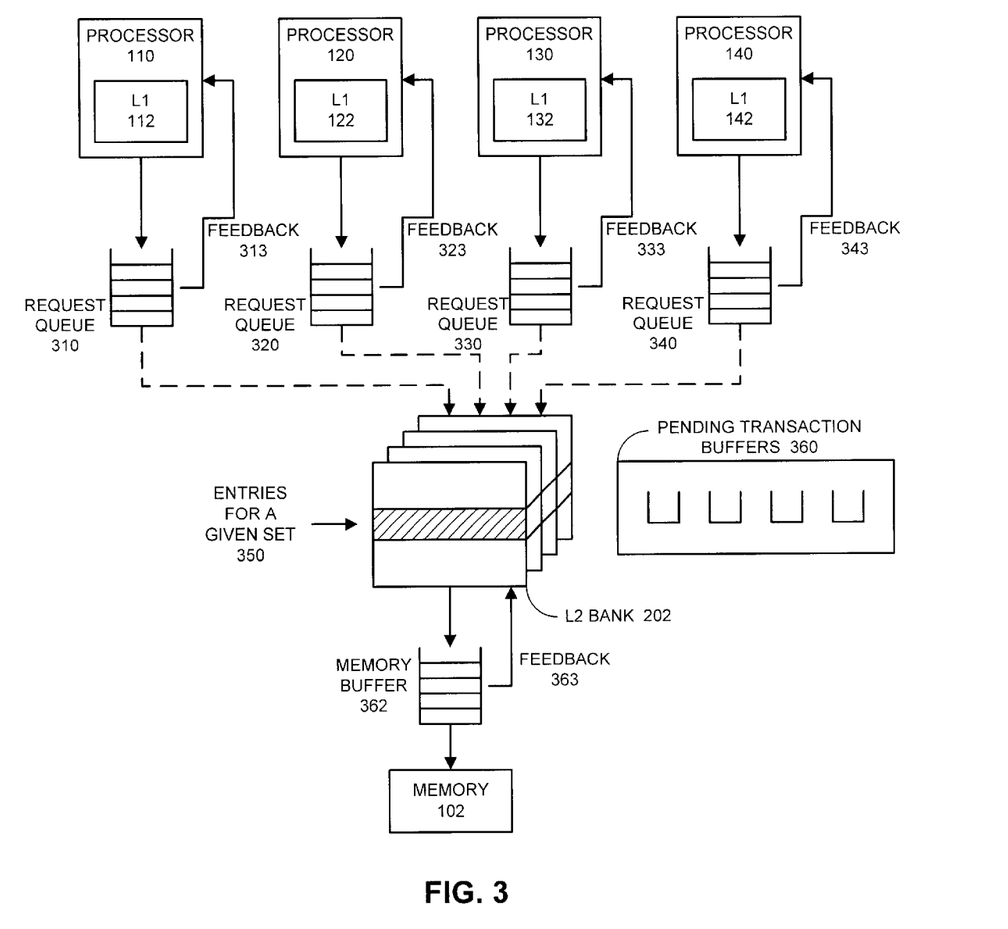
FIG. 3 illustrates the structure of an L2 bank in accordance with an embodiment of the present invention.

FIG. 3 illustrates the structure of an L2 bank 202 in accordance with an embodiment of the present invention. L2 bank 202 is a four-way set-associate cache, wherein there are four entries for each set 350. Note that each entry can be structured as a standard set-associative cache entry, including storage for a cache line as well as storage for tag and status bits. There are additionally four comparators to perform an associative lookup for each set. These standard cache structures, such as comparators, are known to those skilled in the art and are not illustrated in FIG. 3 in the interests of clarity.

Processors 110, 120, 130 and 140 generate accesses to L2 bank 202 as a result of cache misses that arise during accesses to L1 caches 112, 122, 132 and 142. Note that these accesses can include both read and write accesses. These accesses feed through switch 215 (illustrated in FIG. 2) into request queues 310, 320, 330 and 340, which are associated with L2 bank 202. Request queues 310, 320, 330 and 340 are used to store accesses to be processed by L2 bank 202. In one embodiment of the present invention, request queues 310, 320, 330 and 340 can be located at L2 bank 202. In another embodiment, request queues 310, 320, 330 and 340 are located within switch 215.

Request queues 310, 320, 330 and 340 can send associated flow control feedback signals 313, 323, 333 and 343 back to processors 110, 120, 130 and 140, respectively, in order to prevent processors 110, 120, 130 and 140 from sending additional accesses. This ensures that request queues 310, 320, 330 and 340 do not overflow.

In one embodiment of the present invention, the flow control mechanism that operates between request queues 310, 320, 330, 340 and processors 110, 120, 130 and 140 is credit-based. This means a given processor 110 is initially allocated a certain number of "credits" specifying a number of accesses the processor can send to L2 bank 202. Each time processor 110 sends a request to request queue 310, the number of credits is decremented. As requests are in request queue 310 are processed, feedback signal 113 sends one or more credits back to processor 110. This causes the number of credits in processor 110 to increase.

Without using a credit-based flow control system, room must be reserved in request queue 310 to accommodate all possible accesses that may be in-flight between processor 110 and request queue 310. If no additional room is available in request queue 310, a stall signal must be sent to processor 110.

In contrast, by using a credit based control system, processor 110 is able to keep sending accesses to request queue 310 so long as it has credits remaining, even if there is not enough room in request queue 310 to accommodate all possible in-flight transactions.

Note that L2 bank 202 is also associated with a pending transaction buffer 360. Pending transaction buffer 360 keeps track of transactions (accesses) that have been stalled by cache misses. This allows these stalled transactions to be replayed when a desired cache line returns from memory. Note that pending transaction buffer 360 may specify the set and way location for each pending transaction.

During cache misses, L2 bank 202 makes accesses to memory 102 in order to retrieve desired cache lines. These accesses can be pipelined through memory buffer 362, which may be located at memory controller 104 (illustrated in FIG. 1). Note that if memory buffer 362 becomes too full, processor 110, 120, 130 and 140 may be halted through a mechanism that makes use of a feedback signal 363 between memory buffer 362 and L2 bank 202. Note that this mechanism may also be credit-based.

Figure 4:
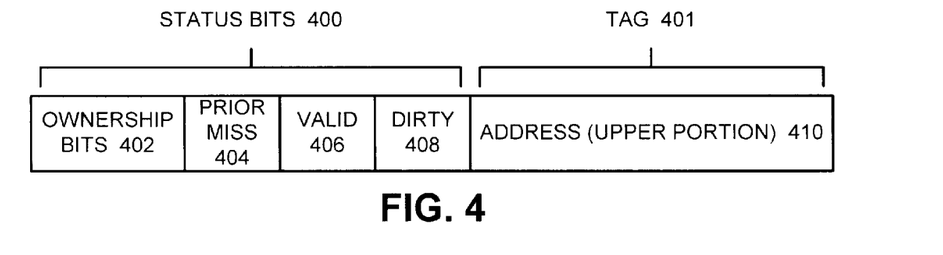
FIG. 4 illustrates status bits and a tag associated with an L2 cache entry in accordance with an embodiment of the present invention.

FIG. 4 illustrates status bits 400 and a tag 401 associated with an L2 cache entry in accordance with an embodiment of the present invention. Tag 401 includes higher order address bits that are used to perform an associative lookup. Status bits 400 include bits that indicate if the corresponding cache entry is dirty 408 and/or valid 406, as well as ownership bits 402 that specify an ownership state for a cache coherence protocol. For example, ownership states can be specified by the MOESI standard.

Status bits 400 also include a prior miss bit 404, which indicates that a miss transaction is in process for the entry. Note that during an associative lookup in the set, prior miss bits for all entries in a set are returned along with the tag information. This allows the system to add the prior miss bits together in order to determine how many cache entries for the set are associated with pending miss transactions.

Pending Miss Operations

Figure 5:
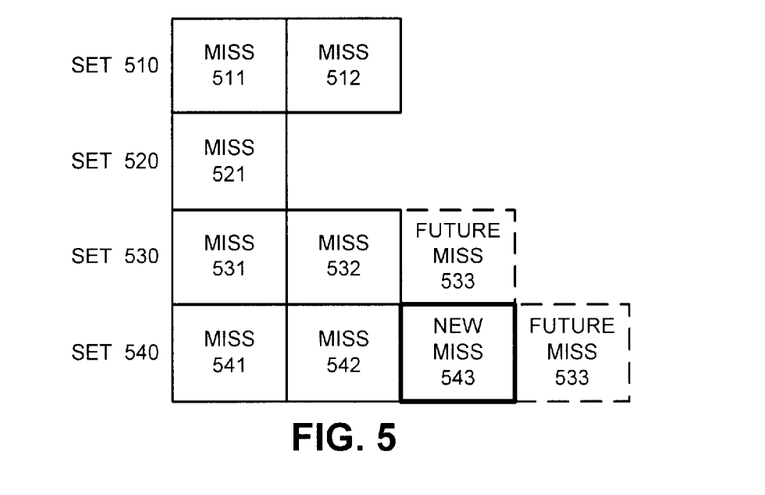
FIG. 5 illustrates an exemplary pattern of pending miss operations in accordance with an embodiment of the present invention.

FIG. 5 illustrates an exemplary pattern of pending miss operations in accordance with an embodiment of the present invention. This example illustrates a number of pending miss transactions for each of four sets, 510, 520, 520 and 540, in a four-way set-associative cache. (Of course, a more realistic set-associative cache has hundreds or thousands of sets.)

In the example illustrated in FIG. 5, set 510 has two pending miss transactions, 511 and 512; set 520 has one pending miss transaction, 521; set 530 has two pending miss transactions, 531 and 532; and set 540 has two pending miss transactions, 541 and 542.

When a new miss 543 arrives for set 540, a stall is generated, even though one entry remains in set 540. A stall is generated at this time because there might be one more future miss 533 in the pipeline that will not be caught by the stall. Consequently, this future miss 533 may cause the last entry in set 540 to be filled. Alternatively, the future miss may cause set 530 to have three entries.

Figure 6:
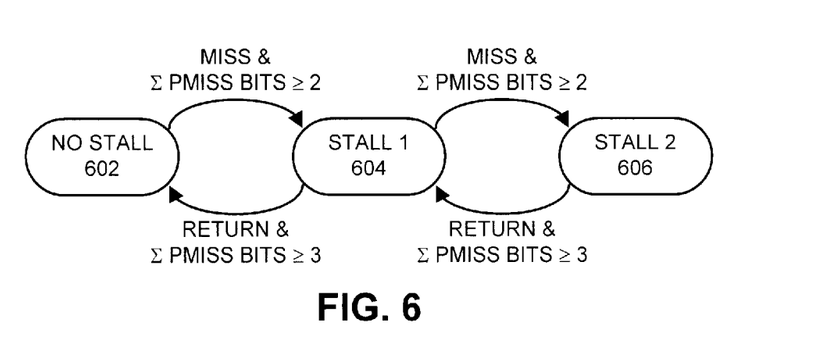
FIG. 6 illustrates a state diagram for pending miss operations in accordance with an embodiment of the present invention.

FIG. 6 illustrates a state diagram for a state machine that keeps track of pending miss operations in accordance with an embodiment of the present invention. The system starts out in no stall state 602. If the system encounters a miss, and the total number of prior miss bits associated with the set is greater then or equal to two, the miss creates a third outstanding miss for the set. Hence, the system enters stall1 state 604.

In stall1 state 604, if the system encounters a miss and the total number of prior miss bits associated with the set is greater than or equal to two, the miss may create a third outstanding miss for another set, or possibly a fourth outstanding miss for the set that caused the system to enter stall1 state 604. This causes the system to enter stall2 state 606 indicating that two pending misses must be cleared before the system can be unstalled.

In stall2 state 602, if a cache line is returned from memory 102 to L2 bank 202, and if the number of prior miss bits in the associated set is greater than or equal to three, the state machine returns to stall1 state 604.

Similarly, in stall1 state 606, if a cache line is returned from memory 102 to L2 bank 202, and if the number of prior miss bits in the associated set is greater than or equal to three, the state machine returns to no stall state 602.

During a miss operation, the prior miss bit is set after the prior miss bits are totaled to determine whether a state transition needs to take place. Note that it is also possible to set the prior miss bit before the bits are totaled. In this case, the number of prior miss bits must be greater than or equal to three (instead of two) to cause a state transition.

Similarly, during a cache line return, a prior miss bit is reset after the number of prior miss bits is totaled. Note that it is possible to reset the prior miss bit before the prior miss bits are totaled. In this case, the number of prior miss bits must be greater than or equal to two (instead of three) to cause a state transition.

Processing of a Cache Access

Figure 7:
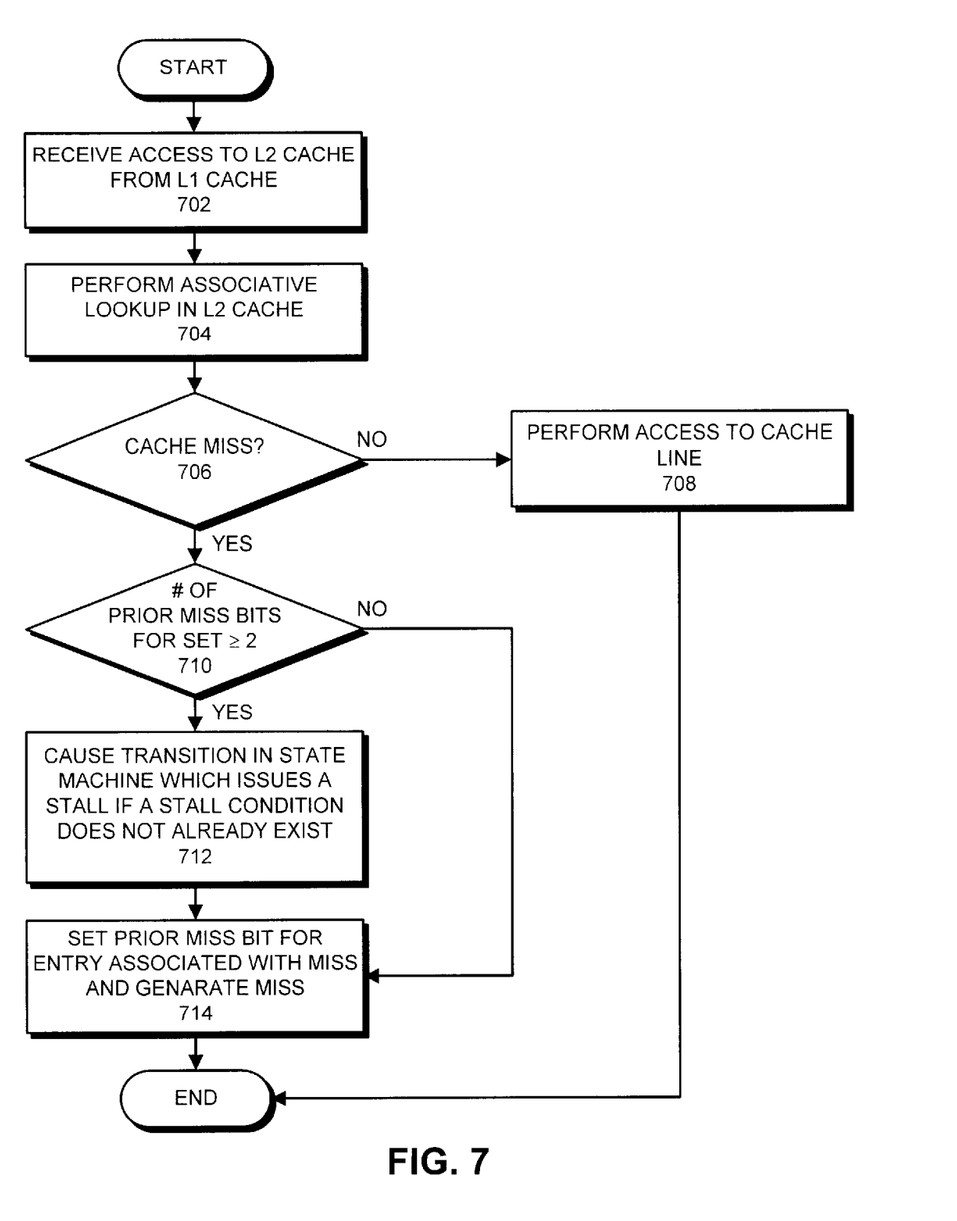
FIG. 7 is a flow chart illustrating processing of a cache access in accordance with an embodiment of the present invention.

FIG. 7 is a flow chart illustrating processing of a cache access in accordance with an embodiment of the present invention. The system starts by receiving an access to L2 bank 202 from processor 110 (step 702). The system then performs an associative lookup in L2 bank 202 (step 704). As a result of this lookup, the system determines whether a cache miss occurs (step 706). If no cache miss occurs, the system performs the access (which can be a read or write operation) to a line in L2 bank 202 (step 708).

If a cache miss occurs, the system determines if the number of prior miss bits for the set is greater than or equal to two (step 710). If not, the system sets a prior miss bit for a cache entry associated with the miss. The system also generates a cache miss by placing the transaction in pending transaction buffer 360 (illustrated in FIG. 3) and requesting a cache line from memory 102 (step 714).

If the number of prior miss bits is greater than or equal to two, the system causes a transition in the state machine, either from state 602 to state 604, or from state 604 to state 606. If the transition is from state 602 to state 604, the system issues a stall request to processor 110, so that processor 110 does not generate additional accesses to L2 bank 202 (step 712). The system then sets a prior miss bit for a cache entry associated with the miss, places the transaction in pending transaction buffer 360, and requests a cache line from memory 102 (step 714).

Processing of a Cache Line Return

Figure 8:
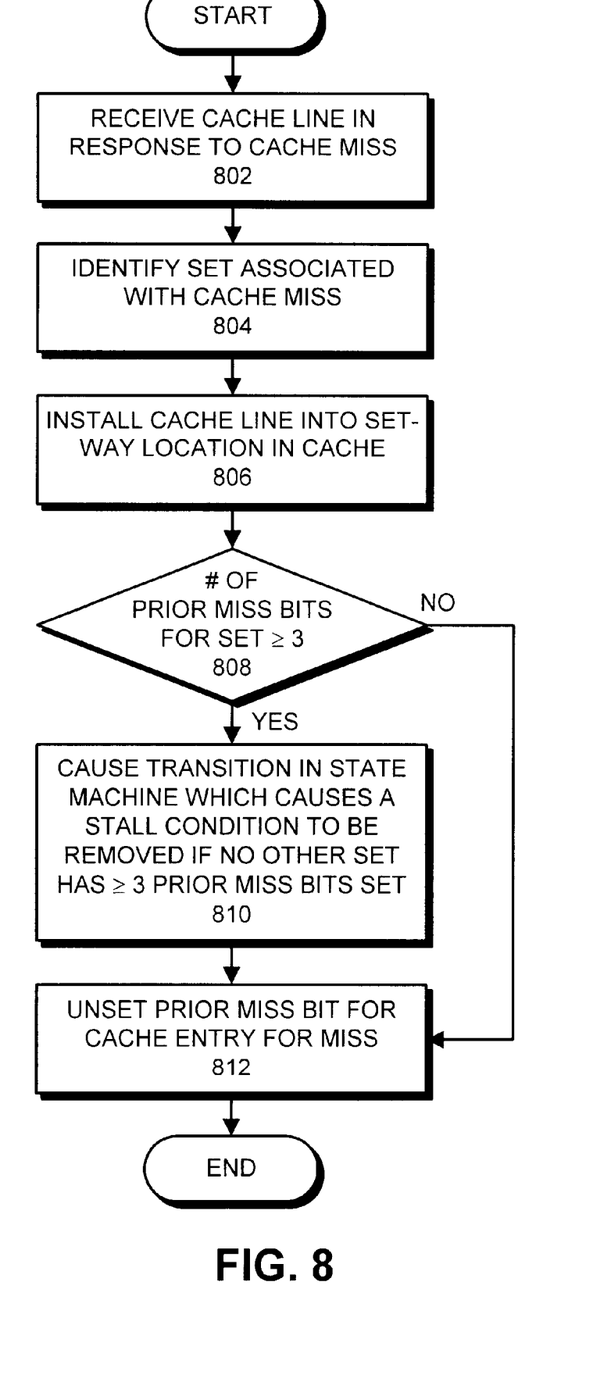
FIG. 8 is a flow chart illustrating processing of a cache line return in accordance with an embodiment of the present invention.

FIG. 8 is a flow chart illustrating processing of a cache line return in accordance with an embodiment of the present invention. The system first receives a cache line from memory 102 in response to a pending miss transaction (step 802). Next, the system identifies the set and way location in L2 bank 202 for the returned cache line (step 804). The system then installs the returned cache line into the set and way location in L2 bank 202 (step 806).

The system also determines if the number of prior miss bits for the set is greater than or equal to three (step 808). If not, the system unsets the prior miss bit for the set and way location that the cache line was installed in and replays any pending transactions for the cache line from pending transaction buffer 360 (step 812).

If the number of prior miss bits for the set is greater than or equal to three, the system causes a transition in the state machine illustrated in FIG. 6. This transition can either be from state 606 to state 604, or from state 604 to state 602. If the transition is from state 604 to state 602, the system removes the stall condition (step 810). The system then unsets the prior miss bit for the set and way location and replays any pending transactions for the cache line from pending transaction buffer 360 (step 812). Note that in performing the above-described operations, the system only has to examine prior miss bits for a single set. It does not have to examine prior miss bits for other sets. This makes the process of examining prior miss bits a purely local operation, which greatly decreases the complexity of the resulting circuit.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating flow control at a cache memory in order to support pipelined accesses to the cache memory, comprising:
   receiving an access to the cache memory;
   wherein the cache memory is set-associative;
   if the access generates a miss in the cache memory,
      identifying a set that the access is directed to,
      incrementing a number of outstanding misses that are currently in process for the set, and
      if the number of outstanding misses is greater than or equal to a threshold value, stalling generation of subsequent accesses to the cache memory until the number of outstanding misses for each set in the cache memory falls below the threshold value, wherein the threshold value is less than a number of entries in the cache memory associated with each set, thereby reserving one or more additional entries for each set to accommodate in-flight accesses that have been generated but not received at the cache memory.

2. The method of claim 1, further comprising:
   receiving a cache line from a memory subsystem in response to an outstanding miss;
   identifying a set that the outstanding miss is directed to;
   installing the cache line in an entry for the set in the cache memory;
   decrementing a number of outstanding misses that are currently in process for the set;
   if the number of outstanding misses will fall below the threshold value as a result of decrementing, and if no other set has a number of outstanding misses that is greater than or equal to the threshold value, removing the stall condition so that subsequent accesses can be generated for the cache memory.

3. The method of claim 2, wherein the method further comprises determining whether to remove the stall condition by examining a state machine;
   wherein the state machine keeps track of a number of outstanding misses that cause sets in the cache memory to meet or exceed the threshold value.

4. The method of claim 2, wherein the method further comprises replaying the access that caused the cache line to be retrieved.

5. The method of claim 1,
   wherein incrementing the number of outstanding misses that are currently in process for the set involves setting a prior miss bit that is associated with an entry for a specific set and way in the cache memory; and
   wherein the prior miss bit indicates that an outstanding miss is in process and will eventually fill the entry for the specific set and way.

6. The method of claim 5, wherein the prior miss bit is stored along with a tag for the specific set and way, so that a tag lookup returns the prior miss bit.

7. The method of claim 1, wherein the cache memory is a Level Two (L2) cache and the access is received from a Level One (L2) cache.

8. The method of claim 7,
   wherein receiving the access involves receiving the access from a queue located at the L2 cache, wherein the queue contains accesses generated by the L1 cache; and
   wherein the method additionally comprises using credit-based flow control to limit sending of accesses from the L1 cache into the queue, so that the queue does not overflow.

9. The method of claim 7, wherein the L2 cache receives accesses from a plurality of L1 caches.

10. An apparatus that facilitates flow control at a cache memory in order to support pipelined accesses to the cache memory, comprising:
    the cache memory, wherein the cache memory is set-associative;
    wherein the cache memory is configured to receive an access;
    a stalling mechanism within the cache memory, wherein if the access generates a miss in the cache memory, the stalling mechanism is configured to,
       identify a set that the access is directed to,
       increment a number of outstanding misses that are currently in process for the set, and
       if the number of outstanding misses is greater than or equal to a threshold value, to stall generation of subsequent accesses to the cache memory until the number of outstanding misses for each set in the cache memory falls below the threshold value, wherein the threshold value is less than a number of entries in the cache memory associated with each set, thereby reserving one or more additional entries for each set to accommodate in-flight accesses that have been generated but not received at the cache memory.

11. The apparatus of claim 10, further comprising a stall removal mechanism, wherein upon receiving a cache line from a memory subsystem in response to an outstanding miss, the stall removal mechanism is configured to:
    identify a set that the outstanding miss is directed to;
    decrement a number of outstanding misses that are currently in process for the set; and
    if the number of outstanding misses will fall below the threshold value as a result of decrementing, and if no other set has a number of outstanding misses that is greater than or equal to the threshold value, the stall removal mechanism is configured to remove the stall condition so that subsequent accesses can be generated for the cache memory.

12. The apparatus of claim 11, further comprising a state machine that the stall removal mechanism examines to determine whether to remove the stall condition;
    wherein the state machine keeps track of a number of outstanding misses that cause sets in the cache memory to meet or exceed the threshold value.

13. The apparatus of claim 11, further comprising a replay mechanism that is configured to replay the access that caused the cache line to be retrieved.

14. The apparatus of claim 10,
    wherein the stalling mechanism is configured to increment the number of outstanding misses that are currently in process for the set by setting a prior miss bit that is associated with an entry for a specific set and way in the cache memory; and wherein the prior miss bit indicates that an outstanding miss is in process and will eventually fill the entry for the specific set and way.

15. The apparatus of claim 14, wherein the prior miss bit is stored along with a tag for the specific set and way, so that a tag lookup returns the prior miss bit.

16. The apparatus of claim 10, wherein the cache memory is a Level Two (L2) cache that is configured to receive the access from a Level One (L1) cache.

17. The apparatus of claim 16, further comprising:

a queue located at the L2 cache that is configured to receive accesses from the L1 cache; and a flow control mechanism that uses credit-based flow control to limit sending of accesses from the L1 cache into the queue, so that the queue does not overflow.

18. The apparatus of claim 16, wherein the L2 cache is configured to receive accesses from a plurality of L1 caches.

19. An apparatus that facilitates flow control at a Level Two (L2) cache in order to support pipelined accesses to the L2 cache, comprising:

the L2 cache, wherein the L2 cache is set-associative;

wherein the L2 cache is configured to receive an access from an L1 cache;

a stalling mechanism within the L2 cache, wherein if the access generates a miss in the L2 cache, the stalling mechanism is configured to, identify a set that the access is directed to, increment a number of outstanding misses that are currently in process for the set, and if the number of outstanding misses is greater than or equal to a threshold value, to stall generation of subsequent accesses to the L2 cache until the number of outstanding misses for each set in the L2 cache falls below the threshold value, wherein the threshold value is less than a number of entries in the cache memory associated with each set, thereby reserving one or more additional entries for each set to accommodate in-flight accesses that have been generated but not received at the cache memory;

a stall removal mechanism, wherein upon receiving a cache line from a memory subsystem in response to an outstanding miss, the stall removal mechanism is configured to, identify a set that the outstanding miss is directed to, decrement a number of outstanding misses that are currently in process for the set, and if the number of outstanding misses will fall below the threshold value as a result of decrementing, and if no other set has a number of outstanding misses that is greater than or equal to the threshold value, the stall removal mechanism is configured to remove the stall condition so that subsequent accesses can be generated for the L2 cache; and a replay mechanism that is configured to replay an access that caused the cache line to be retrieved.

20. A computer system that facilitates flow control at a cache memory in order to support pipelined accesses to the cache memory, comprising:

a processor;

the cache memory;

wherein the cache memory is set-associative and is configured to receive an access;

a stalling mechanism within the cache memory, wherein if the access generates a miss in the cache memory, the stalling mechanism is configured to, identify a set that the access is directed to, increment a number of outstanding misses that are currently in process for the set, and if the number of outstanding misses is greater than or equal to a threshold value, to stall generation of subsequent accesses to the cache memory until the number of outstanding misses for each set in the cache memory falls below the threshold value, wherein the threshold value is less than a number of entries in the cache memory associated with each set, thereby reserving one or more additional entries for each set to accommodate in-flight accesses that have been generated but not received at the cache memory.

* * * * *